(12) United States Patent
Kadowaki et al.

(10) Patent No.: US 10,274,324 B2
(45) Date of Patent: *Apr. 30, 2019

(54) DYNAMIC HIGHLIGHTING OF GEOGRAPHIC ENTITIES ON ELECTRONIC MAPS

(71) Applicant: GOOGLE INC., Mountain View, CA (US)

(72) Inventors: Shiro Kadowaki, Cupertino, CA (US); Fabrice Caillette, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 14/754,345

(22) Filed: Jun. 29, 2015

(65) Prior Publication Data
US 2015/0377630 A1    Dec. 31, 2015

Related U.S. Application Data

(63) Continuation of application No. 13/455,748, filed on Apr. 25, 2012, now Pat. No. 9,069,793.
(Continued)

(51) Int. Cl.
*G06F 17/30*    (2006.01)
*G06F 3/00*    (2006.01)
(Continued)

(52) U.S. Cl.
CPC ............. *G01C 21/26* (2013.01); *G01C 21/00* (2013.01); *G06F 3/00* (2013.01); *G06F 13/00* (2013.01);
(Continued)

(58) Field of Classification Search
CPC ........... G06F 17/3087; G06F 17/30241; G06F 17/30528; G06F 17/30893;
(Continued)

(56) References Cited

U.S. PATENT DOCUMENTS 5,742,922 A    4/1998    Kim
5,767,795 A    6/1998    Schaphorst
(Continued)

FOREIGN PATENT DOCUMENTS

WO    WO-2004/111754 A2    12/2004
WO    WO-2007/127702 A2    11/2007
WO    WO-2009/064996 A2    5/2009

OTHER PUBLICATIONS

Joseph D. Yates et al. "Searching the Web Using a Map", IEEE 2000, pp. 222-229.
(Continued)

*Primary Examiner* — Srirama Channavajjala
(74) *Attorney, Agent, or Firm* — Marshall, Gerstein & Borun LLP

(57) ABSTRACT

Methods, systems, and apparatus, including computer programs encoded on a computer storage medium, can be used to dynamically generate electronic maps with highlighted entity boundaries. In one aspect, a method includes receiving a request for an electronic map segment for a geographic region, with the request identifying a geographic entity to be highlighted in the requested electronic map segment. A plurality of layers of map data associated with the geographic region and data defining a boundary of the identified geographic entity are retrieved in response to the request. The electronic map segment is rendered based on the retrieved plurality of layers of map data and the data defining the boundary of the geographic entity, with one or more of the retrieved layers are rendered over a rendering of a highlighted boundary of the geographic entity. The rendered electronic map segment is transmitted in response to the request.

19 Claims, 11 Drawing Sheets

Related U.S. Application Data

(60) Provisional application No. 61/478,759, filed on Apr. 25, 2011.

(51) Int. Cl.

| | |
|---|---|
| *G01C 21/26* | (2006.01) |
| *G08G 1/123* | (2006.01) |
| *G06F 13/00* | (2006.01) |
| *G09G 5/00* | (2006.01) |
| *G01C 21/00* | (2006.01) |
| *G09B 29/00* | (2006.01) |
| *G06T 11/60* | (2006.01) |

(52) U.S. Cl.
CPC .... *G06F 17/3087* (2013.01); *G06F 17/30241* (2013.01); *G06F 17/30864* (2013.01); *G06T 11/60* (2013.01); *G08G 1/123* (2013.01); *G09B 29/007* (2013.01); *G09G 5/00* (2013.01)

(58) Field of Classification Search
CPC .... G06F 17/30864; G06F 17/00; G06F 17/30; G06F 13/00; G06F 3/00; G01C 21/00; G01C 21/26; G09G 5/00
See application file for complete search history.

(56) References Cited

U.S. PATENT DOCUMENTS

| | | | |
|---|---|---|---|
| 6,101,443 A | 8/2000 | Kato et al. | |
| 6,163,749 A * | 12/2000 | McDonough | G01C 21/367 340/995.14 |
| 6,178,380 B1 * | 1/2001 | Millington | G01C 21/367 340/990 |
| 6,282,362 B1 | 8/2001 | Murphy et al. | |
| 6,928,364 B2 | 8/2005 | Tsuyuki | |
| 9,069,793 B2 | 6/2015 | Kadowaki et al. | |
| 2002/0177944 A1 * | 11/2002 | Ihara | G01C 21/36 701/468 |
| 2003/0033176 A1 | 2/2003 | Hancock | |
| 2003/0069689 A1 * | 4/2003 | Ihara | G09B 29/106 701/455 |
| 2003/0135402 A1 | 7/2003 | Moore | |
| 2003/0220734 A1 | 11/2003 | Harrison et al. | |
| 2004/0001114 A1 | 1/2004 | Fuchs et al. | |
| 2004/0008225 A1 | 1/2004 | Campbell | |
| 2004/0044469 A1 | 3/2004 | Bender et al. | |
| 2006/0101005 A1 | 5/2006 | Yang et al. | |
| 2006/0178827 A1 * | 8/2006 | Aoyama | G01C 21/3664 701/432 |
| 2007/0064018 A1 * | 3/2007 | Shoemaker | G06F 3/0481 345/660 |
| 2008/0059889 A1 | 3/2008 | Parker et al. | |
| 2008/0177462 A1 | 7/2008 | Yoshioka et al. | |
| 2008/0222131 A1 * | 9/2008 | Wang | G06F 17/30867 |
| 2008/0268822 A1 | 10/2008 | Johnson et al. | |
| 2008/0319990 A1 | 12/2008 | Taranenko et al. | |
| 2009/0027418 A1 | 1/2009 | Maru et al. | |
| 2009/0063424 A1 | 3/2009 | Iwamura et al. | |
| 2009/0132469 A1 * | 5/2009 | White | G06Q 10/00 |
| 2009/0132646 A1 * | 5/2009 | Yang | G06F 17/3087 709/203 |
| 2009/0150073 A1 | 6/2009 | Caraballo | |
| 2010/0082240 A1 * | 4/2010 | Short | G01C 21/00 701/532 |
| 2010/0082242 A1 * | 4/2010 | Park | G01C 21/00 701/532 |
| 2010/0088019 A1 | 4/2010 | Barcklay et al. | |
| 2010/0293178 A1 * | 11/2010 | Govani | G06F 17/30864 707/759 |
| 2011/0066371 A1 | 3/2011 | Weiland et al. | |
| 2011/0153185 A1 | 6/2011 | Aben et al. | |
| 2011/0173066 A1 * | 7/2011 | Simmons | G06Q 30/00 705/14.49 |
| 2012/0072287 A1 | 3/2012 | Crane et al. | |
| 2012/0136894 A1 | 5/2012 | Marlow | |

OTHER PUBLICATIONS

Novelty Search Report & Written Opinion for NL Appl. No. 2008690, dated Mar. 12, 2014 (pp. 1-15).

* cited by examiner

US 10,274,324 B2

DYNAMIC HIGHLIGHTING OF GEOGRAPHIC ENTITIES ON ELECTRONIC MAPS

CROSS-REFERENCE TO RELATED APPLICATIONS

This application claims the benefit under 35 U.S.C. § 119(e) of U.S. patent application Ser. No. 61/478,759, entitled "Dynamic Highlighting of Geographic Entities on Electronic Maps," filed Apr. 25, 2011, which is incorporated herein by reference in its entirety.

BACKGROUND

This specification relates to performing dynamic highlighting of geographic entities on electronic maps.

Online mapping utilities provide a convenient resource to view maps of selected geographic areas and to navigate to different levels of detail (e.g., by zooming in or out) and to different geographic areas (e.g., by panning). In some cases, users can select types of features (e.g., terrain, labels, traffic) that are shown on the map. In addition, users may be able to place markers (e.g., waypoints) on a map, draw lines (e.g., routes) on the map, or associate photos or other information with a location on a map. Online map search tools allow users to search for a location or a business and display a map of an area around the location or business. In some cases, a map displayed in response to a search request includes a pin or other marker that shows a location of the location or business that is responsive to the search request. Various map tools also provide mechanisms for overlaying routes (e.g., from a user-selected origination location to a user-selected destination location) or other graphical information on a map.

SUMMARY

This specification describes technologies relating to dynamically highlighting a boundary or extent of a geographic entity. For example, in response to a search query from a user device, a server can identify a geographic entity that is the subject of the search. Based on the identification, data defining a boundary or extent of the geographic entity can be retrieved for use in highlighting the geographic entity on a map. A map segment that includes the geographic entity can be rendered using map layer data and the data defining the boundary of the geographic entity, and at least some of the map layer data can be rendered over the boundary of the geographic entity.

In general, one innovative aspect of the subject matter described in this specification can be embodied in methods that include the actions of receiving, at a server, a request from a client device for an electronic map segment for a geographic region, wherein the request includes an identification of a geographic entity to be highlighted in the requested electronic map segment; retrieving, from one or more content databases, a plurality of layers of map data associated with the geographic region in response to the request for the electronic map segment; retrieving, from one or more geographic entity databases, data defining a boundary of the geographic entity in response to the identification of a geographic entity to be highlighted in the requested electronic map segment; rendering the electronic map segment based on the retrieved plurality of layers of map data and the data defining the boundary of the geographic entity, wherein one or more of the retrieved plurality of layers are rendered over a rendering of a highlighted boundary of the geographic entity; and transmitting the rendered electronic map segment to the client device in response to the request. Other embodiments of this aspect include corresponding systems, apparatus, and computer programs, configured to perform the actions of the methods, encoded on computer storage devices.

These and other embodiments can each optionally include one or more of the following features. A search request that identifies the geographic entity is received, wherein the search request includes the request for an electronic map segment for a geographic region that includes the geographic entity, and highlighting the geographic entity is performed based on an inclusion of the identification of the geographic entity in the search request. A search request that identifies the geographic entity is received, the geographic region that includes the geographic entity is identified in response to the search request, and the identification of the geographic entity to be highlighted in the requested electronic map segment is generated in response to the search request. A set of one or more search results is generated in response to the search query, an identification of a geographic region associated with each search result is generated, and the set of one or more search results and the identification of the associated geographic region are sent to the client device. The request for the electronic map segment for the geographic region is received from the client device in response to at least sending the set of one or more search results and the identification of the associated geographic region to the client device. The request for the electronic map segment for the geographic region is received from the client device in further response to a selection at the client device of a particular search result.

A first search request that identifies the geographic entity is received, wherein the identification of the geographic entity to be highlighted in the requested electronic map segment is based on the identification of the geographic entity in the first search request and highlighting the geographic entity is performed based on the inclusion of the identification of the geographic entity in the first search request. A second search request relating to a geographic region that includes at least a portion of the geographic entity is received, wherein the second search request does not include an identification of the geographic entity, and a plurality of layers of map data associated with the geographic region that includes at least a portion of the geographic entity in response to at least the second search request are retrieved from the one or more content databases. A second electronic map segment is rendered based on the retrieved plurality of layers of map data, wherein the second electronic map segment does not include a highlighted boundary of the geographic entity, and the rendered second electronic map segment is transmitted to the client device in response to at least the second search request. The identification of a geographic entity to be highlighted in the requested electronic map segment is included in the request in response to a selection at the client device of an option to include highlighting of searched geographic features. The data defining a boundary of the geographic entity includes data indicating an imprecise boundary, and the rendering of the highlighted boundary of the geographic entity represents a fuzzy boundary.

The rendered electronic map segment includes a plurality of map tiles, and a resource name is assigned to each of the plurality of map tiles, wherein the resource name for the map tiles that include at least a portion of the rendering of the highlighted boundary of the geographic entity distinguishes the map tile from a map tile having a corresponding geographic scope without the highlighted boundary of the geographic entity. The plurality of the map tiles are cached, and a second request for an electronic map segment for the geographic region is received, wherein the second request does not include an identification of a geographic entity to be highlighted in the requested electronic map segment. A subset of the cached map tiles is identified, wherein the subset includes map tiles that do not include a rendering of the highlighted boundary of the geographic entity, map tiles that do not include a rendering of the highlighted boundary of the geographic entity corresponding to the cached map tiles for the geographic region that include a rendering of the highlighted boundary of the geographic entity are retrieve, and the cached map tiles in the identified subset and the retrieved map tiles are presented to provide the requested electronic map segment. The rendering of the highlighted boundary of the geographic entity includes at least one of an outline of an area corresponding to the geographic entity on the electronic map segment or a fill of an area corresponding to the geographic entity on the electronic map segment. The rendering of the highlighted boundary of the geographic entity includes an outline of edges of a road. The retrieved plurality of layers that are rendered over a rendering of a highlighted boundary of the geographic entity include at least one of labels, roads, icons, or geographic features.

In general, another aspect of the subject matter described in this specification can be embodied in methods that include the actions of receiving a request for an electronic map segment for a geographic region, wherein the request includes an identification of a geographic entity identified based on a search request for the geographic entity submitted from a client device; retrieving, in response to the request for the electronic map segment, a plurality of layers of map data associated with the geographic region and data defining a boundary of the geographic entity; rendering the electronic map segment based on the retrieved plurality of layers of map data and the data defining the boundary of the geographic entity, wherein one or more of the retrieved plurality of layers are rendered over a rendering of a highlighted boundary of the geographic entity; and transmitting the rendered electronic map segment in response to the request.

These and other embodiments can each optionally include one or more of the following features. The rendering of the highlighted boundary of the geographic entity has a different appearance in the rendered electronic map segment than renderings of the plurality of layers of map data. One or more uniform resource locators identifying the geographic region are received, including the identification of the geographic entity, and indicating that a boundary of the geographic entity is to be highlighted, and the one or more uniform resource locators are interpreted to identify the geographic region, the plurality of layers of map data, and the geographic entity. The one or more uniform resource locators are generated in response to a search request identifying the geographic entity. A second request for a second electronic map segment for a second geographic region that includes at least a portion of the geographic entity is received, wherein the second geographic region is identified based on a search request submitted from a client device, andm in response to the second request for the second electronic map segment, a plurality of layers of map data associated with the geographic region are retrieved. The second electronic map segment is rendered based on the retrieved plurality of layers of map data without rendering a highlighted boundary of the geographic entity, and the rendered second electronic map segment is transmitted in response to the second request. The geographic entity includes a first geographic entity, and a second request for a second electronic map segment for a second geographic region that includes at least a portion of the first geographic entity is received, wherein the second request includes an identification of a second geographic entity identified based on a search request for the second geographic entity submitted from a client device. In response to the second request for the second electronic map segment, a plurality of layers of map data associated with the second geographic region and data defining a boundary of the second geographic entity are retrieved. The second electronic map segment is rendered based on the retrieved plurality of layers of map data and the data defining the boundary of the second geographic entity, wherein one or more of the retrieved plurality of layers are rendered over a rendering of a highlighted boundary of the second geographic entity without rendering a highlighted boundary of the first geographic entity, and the rendered second electronic map segment is transmitted in response to the second request. The rendering of the highlighted boundary of the geographic entity represents a fuzzy boundary for the geographic entity.

In general, another aspect of the subject matter described in this specification can be embodied in systems that include one or more map request interpretation servers, one or more map rendering servers, and one or more map front end servers. The one or more map request interpretation servers are adapted to receive a map request for an electronic map segment for a geographic region, wherein the map request includes an identification of a geographic entity identified based on a search request related to the geographic entity submitted from a user device, and request retrieval, in response to the map request for the electronic map segment, a plurality of layers of map data associated with the geographic region and data defining a boundary of the geographic entity. The one or more map rendering servers are adapted to render the electronic map segment based on the retrieved plurality of layers of map data and the boundary of the geographic entity, wherein one or more of the retrieved plurality of layers are rendered over a rendering of a highlighted boundary of the geographic entity. The one or more map front end servers are adapted to transmit the rendered electronic map segment in response to the map request.

These and other embodiments can each optionally include one or more of the following features. The system can include one or more map search servers adapted to receive the search request for the geographic entity submitted from a user device, identify a geographic region associated with the geographic entity in response to the search request, and generate the identification of the geographic entity in response to the search request. The one or more map search servers are further adapted to generate a uniform resource locator including the identification of the geographic region and the identification of the geographic entity. A user device is adapted to display the rendered electronic map segment. The user device is further adapted to transmit the map request to the map request interpretation server in response to receiving the uniform resource locator. The user device is further adapted to initiate the search request.

Particular embodiments of the subject matter described in this specification can be implemented so as to realize one or more of the following advantages. The boundary or extent of a particular geographic entity can be displayed on a user interface. Users may be able to readily determine, for example, whether a particular location falls within the boundary of a specific geographic entity or the size and shape of a particular geographic entity. The boundary can be displayed in response to a search request that identifies or relates to the geographic entity and/or can be displayed in a manner that distinguishes the appearance of the boundary from other features displayed on an electronic map. An electronic map that includes the boundary can be rendered dynamically, and the highlighting of the boundary can be rendered so that it does not obscure other features (e.g., labels, streets, important geographic features, or icons) included on a map. Maps or map tiles that include highlighted boundaries can use resource names (e.g., uniform resource identifiers) that indicate that the map or map tile includes highlighting and/or an identification of the entity that is highlighted, which can facilitate re-use of the map or map tile (e.g., from a cache) if highlighting is desired or can help indicate that a non-highlighted version of the map or map tile needs to be retrieved or generated if the same highlighting is not desired. Different styles of highlighting can be used depending on whether the boundaries are concrete or are less definitive. Different styles can also be applied according to the particular context (e.g., thicker highlighting can be used when a map is zoomed out so that relative location to other entities is easier to recognize, paler highlighting can be used when map is zoomed in so that highlighting does not interfere with map details, changing layer levels to place the highlighting so it less interfering, or using different style for different map styles).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
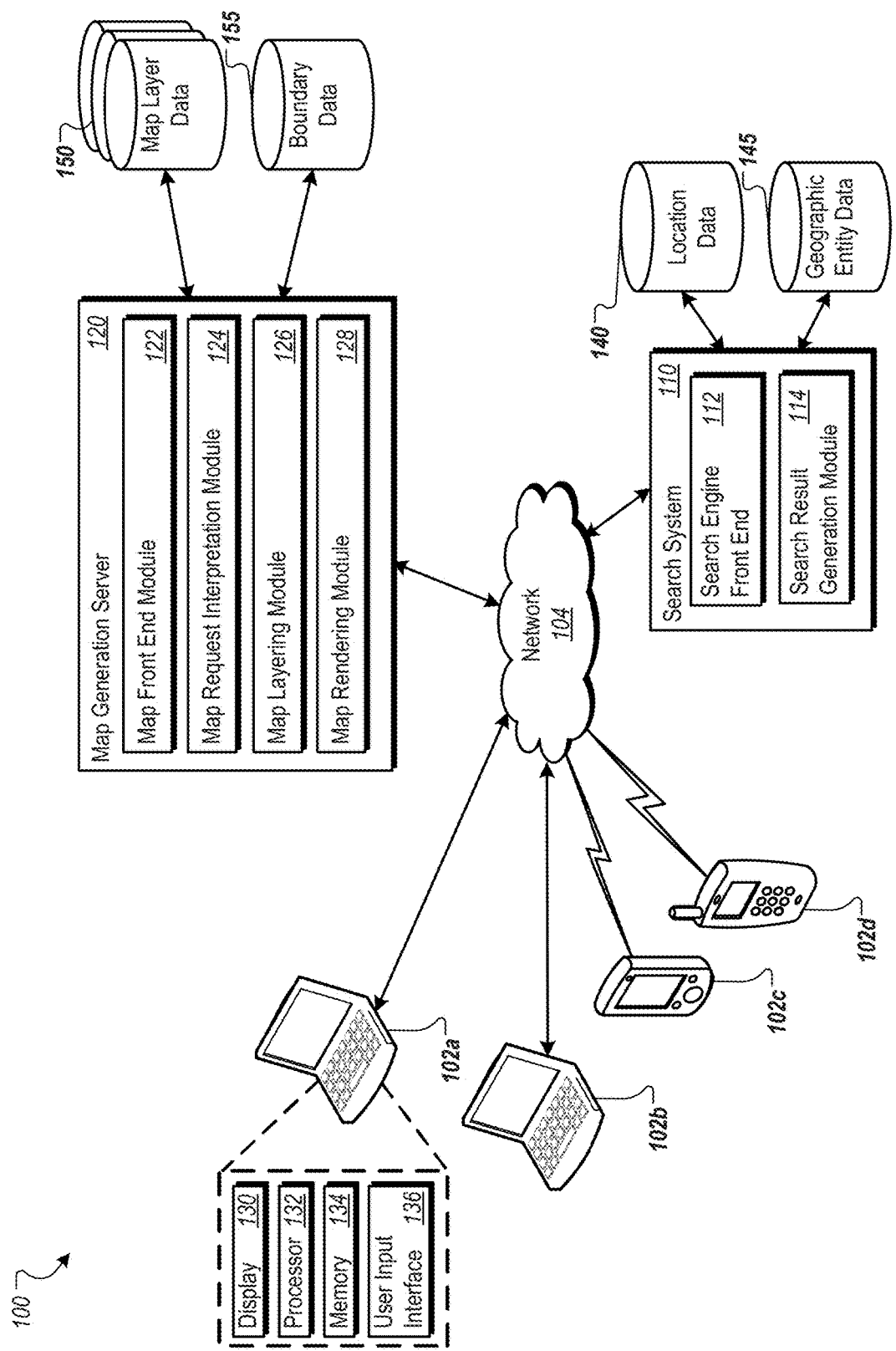
FIG. 1 is a block diagram of an electronic map generation system.

FIG. 1 is a block diagram of an electronic map generation system 100. The system 100 can be used for dynamically generating highlighted boundaries on a dynamically generated electronic map segment. The system 100 includes user devices 102, a search system 110, and a map generation server 120. The user devices 102 are capable of communicating over a network 104 (e.g., the Internet or other wide area network, a local area network, a cellular network, any other network capable of carrying electronic data, or any combination thereof) with the search system 110 to initiate search queries and receive search results. In addition, the user devices 102 can also communicate over the network 104 with the map generation server 120 to request and receive electronic map segments. In some embodiments, the search system 110 and the map generation server 120 can be implemented in the same physical servers, although the actions performed by the search system 110 and the map generation server 120 may be performed by different modules and/or different virtual machines. Moreover, although the map generation server 120 is depicted as a single server, the map generation server 120 may be implemented across multiple servers in a server farm or across multiple server farms that cooperate to perform the operations of the map generation server 120.

Generally, electronic maps are not retrieved in their entirety, at least not when the available electronic map includes a large amount of detail and/or covers a large geographic area that can be viewed at varying zoom levels. Rather, electronic maps are generated in segments according to parameters provided by the user devices and/or the search system 110. An electronic map segment may include multiple electronic map tiles, with each map tile being rendered independently of neighboring tiles, and the size and zoom level of the map segment may be selected based on the size of the geographic entity (e.g., neighborhood, city, state), the size or shape of the display on which the electronic map segment is to be displayed, and/or other parameters (e.g., a desired number of initially hidden map tiles to be provided in case the user pans or zooms). The map tiles can be embodied in electronic documents. An electronic document (which for brevity will simply be referred to as a document) may, but need not, correspond to a file. A document may be stored in a portion of a file that holds other documents, in a single file dedicated to the document in question, or in multiple coordinated files.

The user devices 102 can include, for example, personal computers 102a and 102b, personal digital assistants 102c, mobile phones 102d, or other types of devices (e.g., tablet computers) capable of communicating over a network 104 and displaying electronic maps to a user. Generally, the user devices 102 include a display 130, a processor 132, a memory 134, and a user input interface 136. Users can enter search queries or other parameters using the user input interface 136 to initiate retrieval of search results or electronic map segments. For example, the user input interface 136 may be used to type a search query into a search field in a web page displayed on the display 130. The web page may be stored in the memory 134 and displayed on the display 130 in accordance with instructions executed by the processor 132. The memory 134 may also store instructions that, when executed by the processor 132, cause the user device 102 to transmit search requests to the search system 110, display received search results, request electronic map segments (e.g., based on user input or on data received from the search system 110), and display received electronic map segments. In some cases, the user device 102 can automatically request (e.g., using scripts or other instructions) electronic map tiles identified in a search result returned by the search system 110.

The memory 134 may also store cached electronic map tiles. Scripts (e.g., JavaScript®) or other instructions can be used to manage the cache such that received electronic map tiles are stored in the cache (e.g., during a session, for some other predetermined period of time, or until the cache reaches a size threshold) and can be retrieved from the cache rather than requesting them from the map generation server 120 (e.g., when a user pans away from an area and then pans back to the same area). The search system 110 and/or the map generation server 120 can assign unique uniform resource locators (URLs) to the map tiles. The URLs can be used by the user device 102 to identify, to the map generation server 120, specific map tiles that are needed. The URLs can also be used to catalog map tiles that are stored in the cache such that when a particular map tile is needed, the user device 102 can first check the local cache to determine if the map tiles has already been retrieved. If so, the local copy of the map tile can be used. If not, the user device 102 can request the map tile from the map generation server 120. In some implementations, map tiles may similarly be cached at the server level so that frequently used map tiles need not be repeatedly generated by the map generation server 120.

The search system 110 can receive search requests from user devices 102 at a search engine front end 112. The search system 110 can be implemented across a large number of modules and/or servers, which may further be geographically distributed in multiple server farms. In some embodiments, the search system 110 may be designed to handle numerous different types of search requests (e.g., general web searches and map searches) although such search requests may be submitted using different web pages or web interfaces. In such embodiments, the search engine front end 112 may be responsible for routing the search request to the appropriate modules or servers according to the type of search request. In other embodiments, the search system may be focused on a particular type of search request (e.g., a map search), and the search engine front end 112 may perform pre-processing (e.g., separating the search request into component parts or re-sequencing or normalizing the search request) and/or determine how to route the request or component parts of the request.

The search system 110 may determine if a received search request is for a specific location or entity using location data stored in one or more entity databases 140. For example, the received search query may be compared against known entities to identify one or more possible entities responsive to the search query. Although the search system 110 may be capable of identifying virtual entities (e.g., web sites or businesses independent of their physical location or locations), the entity databases are generally used in support of the techniques described in this specification to identify physical locations of entities. In some cases, the search system 110 may identify a virtual entity and then determine if the virtual entity has a corresponding physical presence (e.g., near a user's current location if the user permits location data to be provided to the search system 110, or near a location of a map currently displayed on the user device 102 when the user submits the search query).

The search system 110 includes a search result generation module 114, which again may be implemented across a large number of servers. If one or more entities are identified as being responsive to the search query, the search result generation module 114 can retrieve data from a geographic entity database 145 that provides data about the entity at a particular location. The geographic entity data can include, for example, data indicating a physical location of the entity (e.g., an approximate center of the entity), a physical size of the entity (e.g., how far the outer boundaries of the entity are from the entity center), a preferred map segment and zoom level to display for the entity, and/or a URL or other identifier associated with a preferred map segment for the entity. In some cases, the search result generation module 114 may generate an appropriate URL based, for example, on the location of the entity and physical size of the entity, or the URL can be dynamically generated by client module (e.g., using JavaScript®) based on information returned by the search result generation module 114 and/or the user's behavior (e.g., pan, zoom, etc). The URL can include an identification of the entity and an indication that the boundary of the entity is to be highlighted in an electronic map segment provided in response to the search query or in response to a selection of a search result for the search query. Moreover, the URL may be generated based on the type of map (e.g., plain map, terrain map, satellite map, or combination) to be provided and on user-selected options for features to be included on the map segment. Thus, the URL can include data that can be parsed and interpreted to dynamically generate an electronic map segment that includes features desired by the user and that includes highlighting of the border of the particular geographic entity. The inclusion of data indicating that such border highlighting should be included can be based on the nature of the search request (e.g., a search request for the specific entity to be highlighted) and/or on user-selected preferences that indicate whether entity highlighting is desired. The search result generation module 114 can also perform other operations, e.g., generating a web page that includes a list of the search results.

Once the search results generation module 114 has generated one or more search results, the search system 110 transmits the search result or results to the user device 102. In some cases, the search result can be a single geographic entity (e.g., for a map search with a high confidence level in a particular result) or the set of search results can be limited to a single map result (e.g., for a general search that has a relatively high likelihood of being an entity location search). In other cases, the search results can include multiple geographic entities, each of which may have a different associated URL for use in retrieving a highlighted map segment.

After receiving the search result or results, the user device 102 can automatically send a request (e.g., using a script incorporated in the search results web page) to the map generation server 120 to retrieve the electronic map segment. Alternatively, retrieval of the map segment may be initiated upon selection of a particular search result by the user. As another alternative, a thumbnail or other small map segment may be requested automatically for one or more search results, and, if the user selects the thumbnail or small map segment or a link associated with the corresponding search result, a larger electronic map segment can be retrieved. In yet another alternative embodiment, an electronic map segment can be retrieved prior to sending the search result or results to the user device 102. In such a case, the search system 110 can interact directly with the map generation server 120 and the search result or results can include the electronic map segment. While such a technique may simplify the operations (e.g., scripting) performed at the user device 102, it can also introduce delay in sending results to the user device 102.

The map generation server 120 receives requests to generate an electronic map segment at a map front end module 122, which may handle receiving map requests and sending responsive maps to the requesting user device 102. The map front end module 122 can pass the request along to a map request interpretation module 124. The map request interpretation module 124 can parse the request (e.g., by separating out different fields in a received URL that identifies the requested map segment or a received plurality of URLs that describe the requested map tiles that make up the map segment) and can interpret the parsed information to determine what map data is needed to generate the requested map segment. For example, the map request interpretation module 124 can determine the type of base map data is needed (e.g., plain map, terrain, and/or satellite imagery), the general location and zoom level within the universe of available map data (e.g., by identifying particular tiles, an area between or including specific geographic coordinates, a center point and zoom level, etc.), map layers needed, whether highlighting is to be applied, and/or the entity to be highlighted. The identification of map data can be passed to a map layering module 126, which retrieves the appropriate map layer data from one or more map layer databases 150. For example, the map layer databases 150 can store data including base map data, roads, terrain, geographic features, municipalities, labels, icons, satellite imagery, traffic data, photos, user-generated content, etc. The map layering module 126 can also retrieve data defining the boundary of the geographic entity to be highlighted from a boundary database 155, which can store, for example, polygon and/or polyline information corresponding to various geographic entities (e.g., city, county, or other administrative division; street; school district; neighborhood; province; state; zip code area; building; campus; etc.). In some instances, the boundary data can include multiple segments and/or can define multiple non-contiguous areas (e.g., for a campus, municipality, or country that includes non-contiguous physical locations). The boundary data can also include data indicating that some or all of the boundary is imprecise (e.g., for a neighborhood) and/or a degree of imprecision.

The map layer data and boundary data are used by a map rendering module 128 to generate the requested electronic map segment. In some implementations, the layers can be rendered in a relative sequence to prevent information in certain layers (e.g., labels or roadways) from being obscured. Thus, the boundary highlighting can be rendered behind other layers. Rendering in a relative sequence need can be done either temporally (e.g., by rendering each layer on top of the prior layer in a specific sequence) or in a relative positional sequence without regard for the temporal sequence (e.g., by selectively rendering certain layers behind or in front of other layers). The requested electronic map segment can thus be dynamically rendered to provide selective boundary highlighting of a geographic entity that was the subject of a search request or that is otherwise identified as being of particular interest for display to the user. The boundary highlighting can include any type of visual features (e.g., solid, dashed, and/or colored boundary lines, semi-transparent fill or shading, fill patterns, etc.) that tends to distinguish the boundaries and/or extent of the geographic entity from other parts of the map segment. Boundary highlighting for imprecise boundaries can use fuzzy boundaries (e.g., boundaries that do not include distinct edges or that gradually fade in a particular direction). In addition, data indicating the degree of imprecision for a boundary can be used to modify the fuzziness of the boundary (e.g., how quickly the boundary fades).

The rendered electronic map segment can then be transmitted back to the requesting user device 102 by the map front end module 122 for presentation on a display 130 of the user device 102. In some implementations the map front end module 122, the map request interpretation module 124, the map layering module 126, and the map rendering module 128 can be implemented in different servers and/or in a virtual computing environment.

Figure 2:
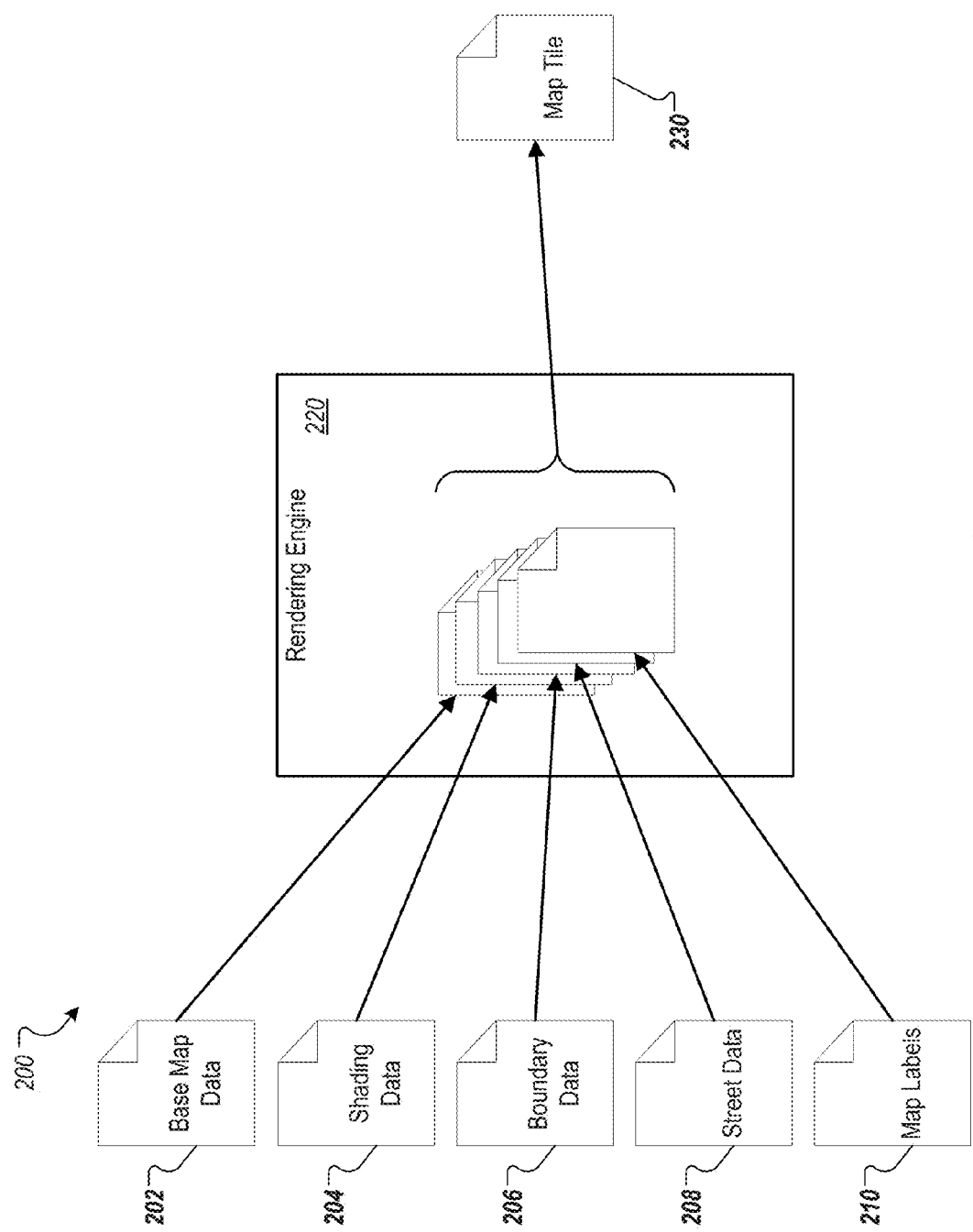
FIG. 2 is a conceptual diagram of a process for rendering map layers and boundary highlighting to generate an electronic map segment.

FIG. 2 is a conceptual diagram of a process 200 for rendering map layers and boundary highlighting to generate an electronic map segment 230. In this illustrative example, map layers including base map data 202, shading (or color) data 204, boundary data 206, street data 208, and map label data 210 are provided to a rendering engine 220, which renders the various layers in a particular positional sequence (e.g., to prevent information, graphics, or images in certain layers from obscuring information, graphics, or images in other layers). The positional sequence can be predetermined but can also vary depending on the type of map, user preferences, user selections, and/or the combination of layers that are included in a particular map segment. The rendering engine 220 outputs an electronic map segment 230 that can include boundary highlighting generated in a manner such that the map is customized according to the particular search query submitted by the user. In other words, different map segments (i.e., with different highlighted geographic entities) can be generated for a particular geographic area dynamically.

Figure 3A:
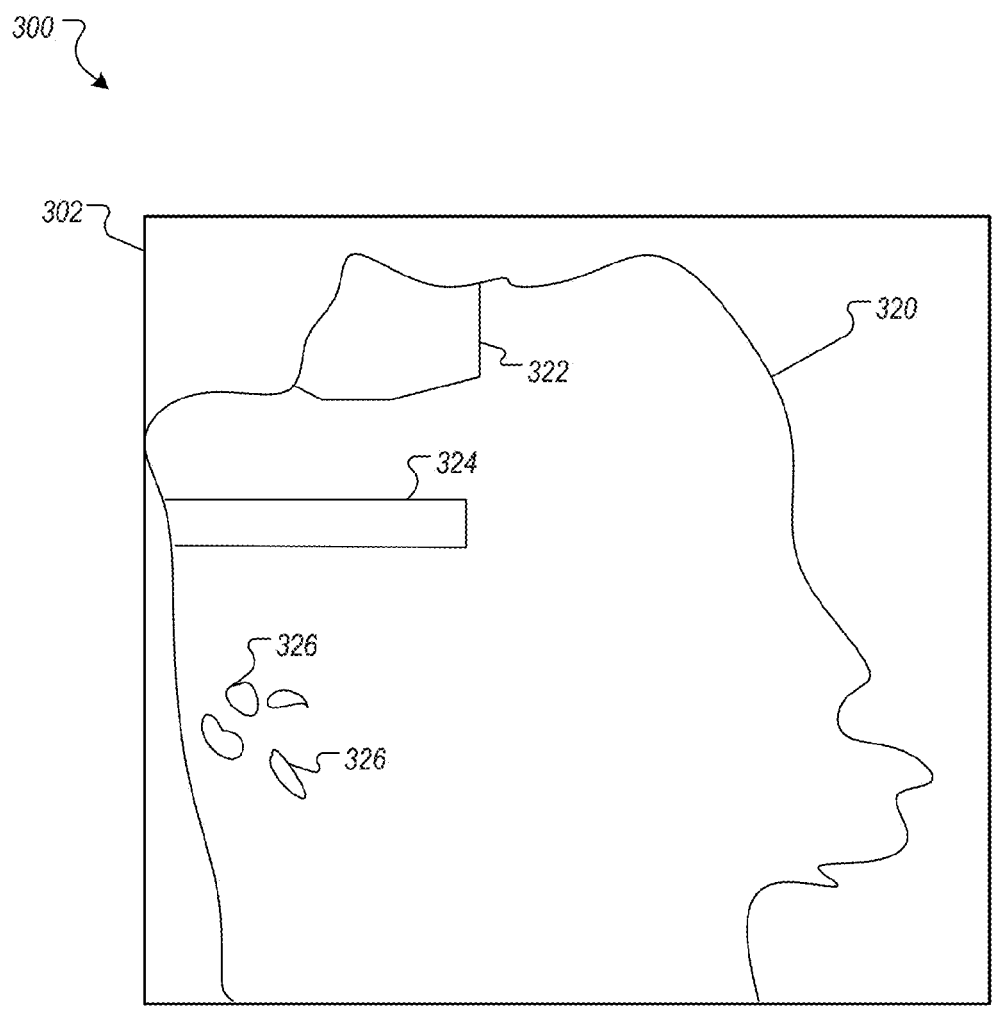
FIGS. 3A-3E illustrate an example of a rendering sequence for an electronic map.
Figure 3B:
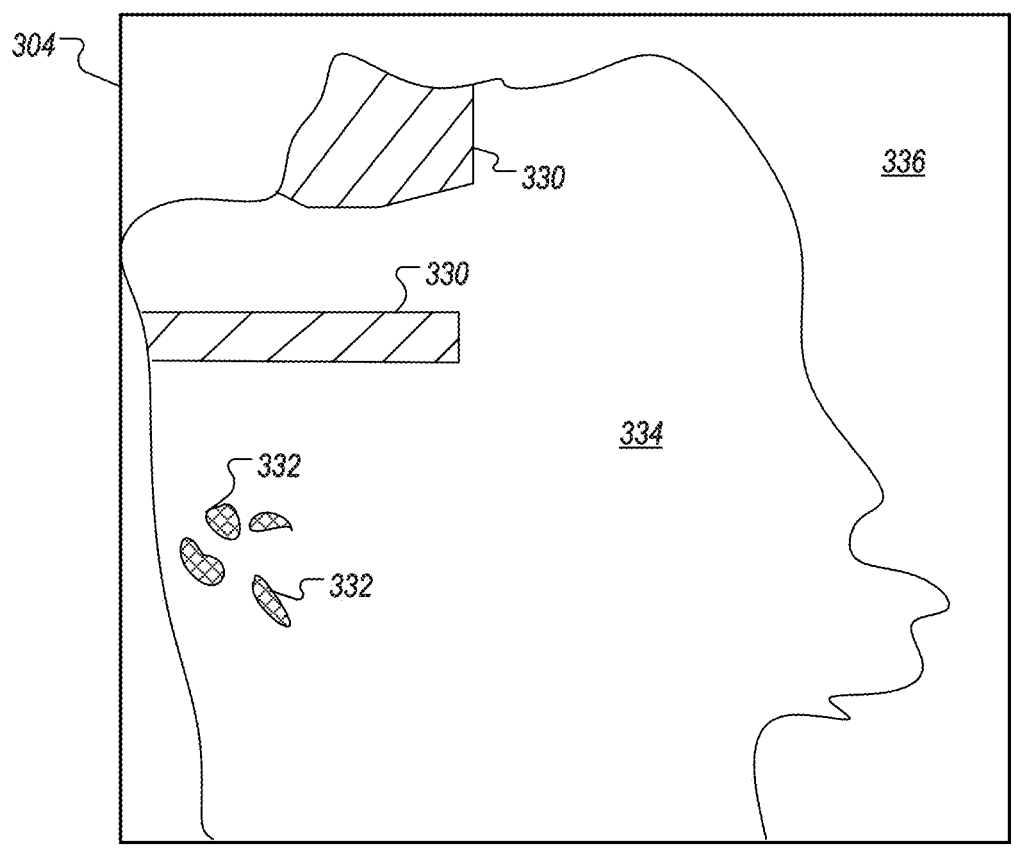
Figure 3C:
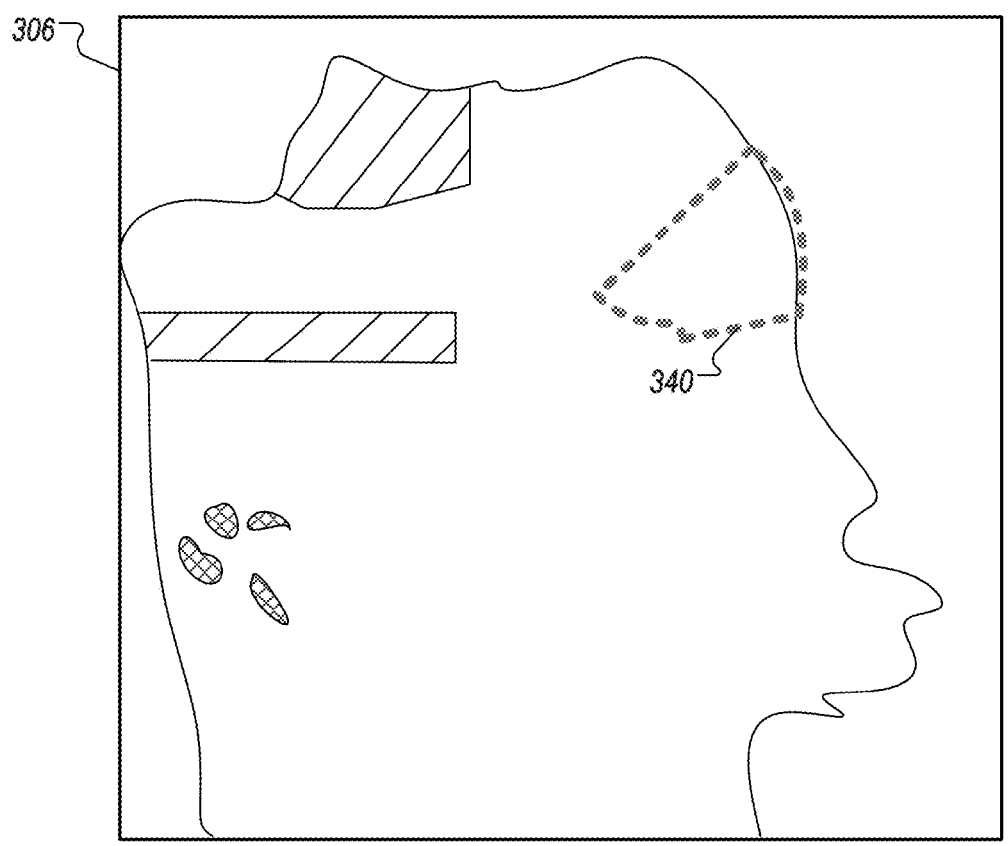
Figure 3D:
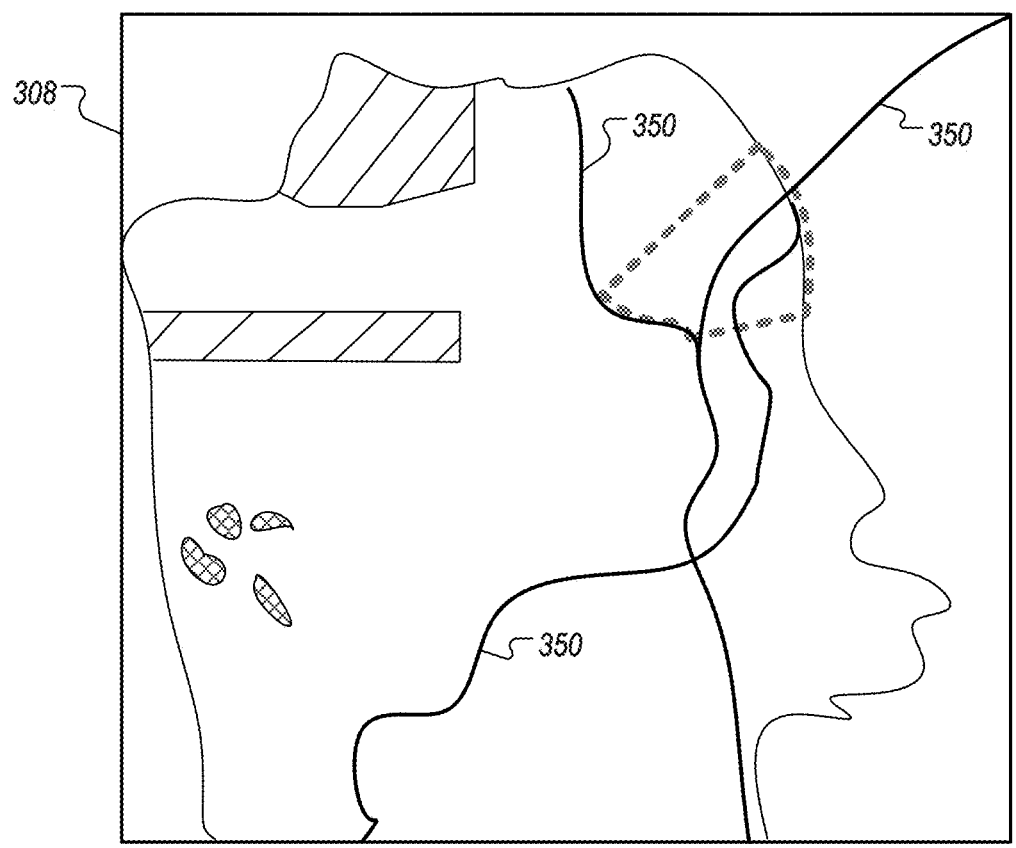
Figure 3E:
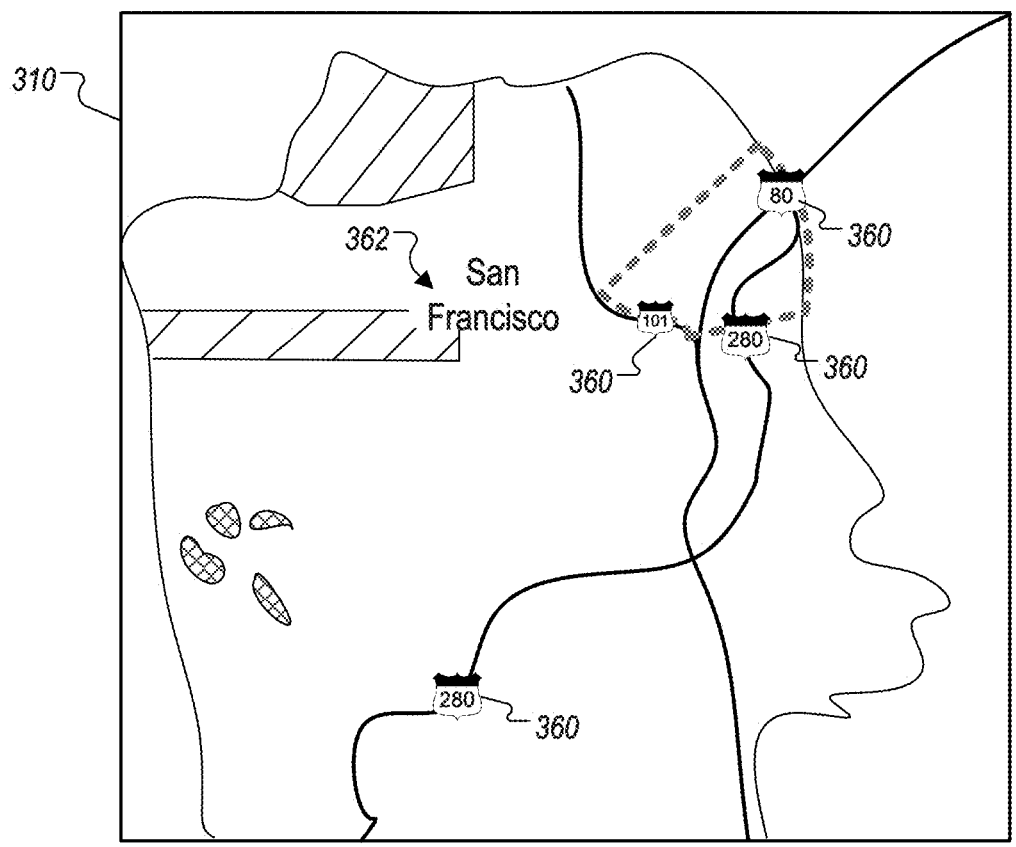

FIGS. 3A-3E illustrate an example of a rendering sequence for an electronic map 300. The rendering sequence is intended for illustrative purposes and does not include full map details. Moreover, different temporal sequences of rendering the map layers can be used to achieve the same end result (e.g., relative positional sequence of the map layers). FIG. 3A depicts an illustrative example of a base map layer 302 that includes a shoreline 320, park boundaries 322, and lake boundaries 324. FIG. 3B depicts an illustrative example of a map shading layer 304 overlaying the base map layer 302. The map shading layer 304 includes first shading or coloring 330 for parks and second shading or coloring 332 for lakes. The map shading layer 304 can also include additional shading or coloring for other land areas 334 and surrounding water 336, although such shading or coloring is not shown in FIG. 3B for convenience. FIG. 3C depicts an illustrative example of an entity boundary layer 306 overlaying the map shading layer 304. The entity boundary layer 306 includes a highlighted boundary 340 for a selected geographic entity (e.g., a neighborhood, such as the so-called SoMa or South of Market neighborhood in San Fransisco). FIG. 3D depicts an illustrative example of a roads layer 308 overlaying the entity boundary layer 306. The roads layer 308 includes various major roadways 350. Although only a few roadways are shown for convenience, a typical map at a city zoom level may include numerous roads. In this example, the roads partially obscure the geographic entity boundary 340, although in some implementations, the boundary 340 can be depicted such that the location of the boundary can still be determined despite the partial obstruction (e.g., using a semi-transparent fill or using boundary lines that are adjacent to the potentially obscuring roadway graphics). FIG. 3E depicts an illustrative example of a labels layer 310 overlaying the roads layer 308. The labels layer 308 includes roadway labels 360 and geographic location labels 362 that further partially obscure graphics in underlying layers, including the geographic entity boundary 340.

Figure 4:
FIG. 4 is an illustrative example of a highlighted boundary for a geographic entity in a more detailed electronic map segment.

FIG. 4 is an illustrative example of a highlighted boundary 405 for a geographic entity in a more detailed electronic map segment 400. In this example, the highlighted boundary 405 includes a colored outline and a semi-transparent fill, both of which differentiate the extent of the selected geographic entity (i.e., Switzerland) from other areas shown on the map segment without obscuring at least the geographic labels on the map segment.

Figure 5:
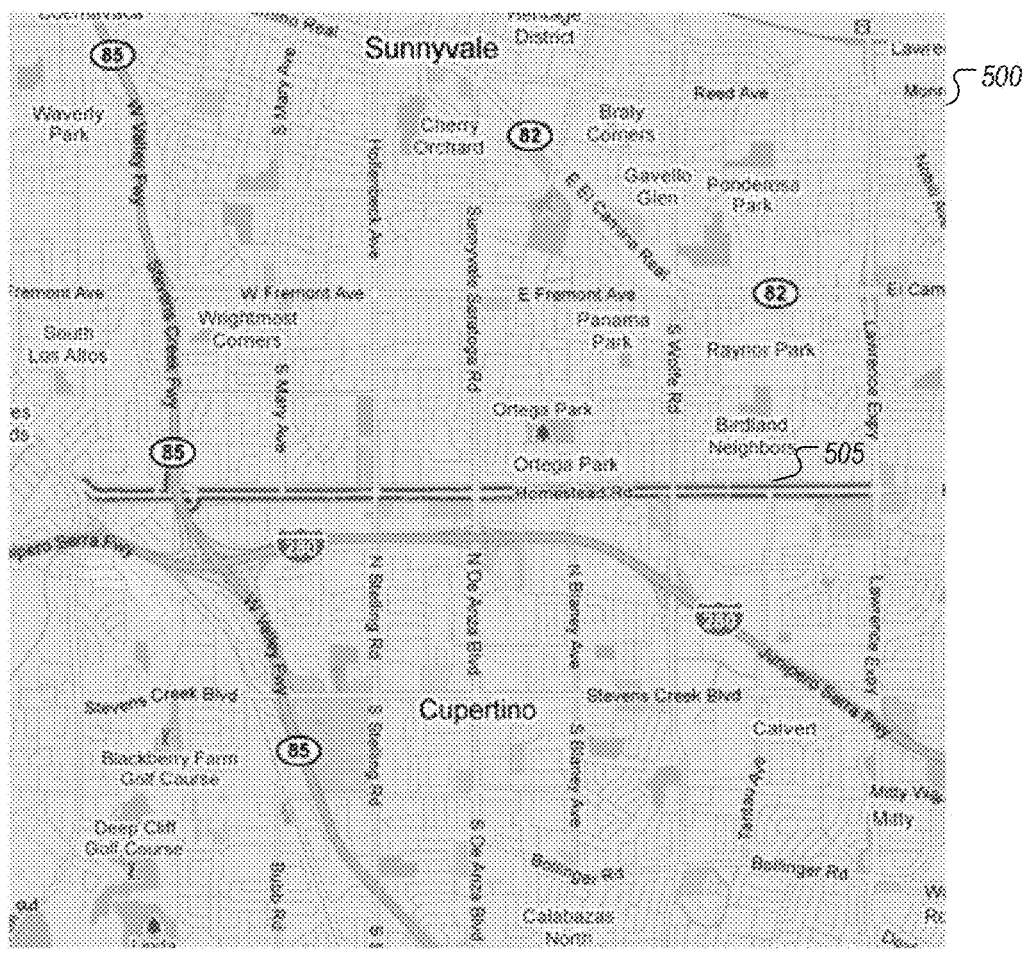
FIG. 5 is another illustrative example of a highlighted boundary for a geographic entity in a more detailed electronic map segment.

FIG. 5 is another illustrative example of a highlighted boundary 505 for a geographic entity in a more detailed electronic map segment 500. In this example, the highlighted boundary 505 indicates the extent of a road (i.e., the entire length of a particular roadway, e.g., before it changes to a different name, dead-ends, or meets another roadway). The highlighted boundary 505 includes a colored outline that differentiates the extent of the selected geographic entity (i.e., Homestead Road) from other roads and areas shown on the map segment. Again, the highlighted boundary 505 does not obscure either the graphics for the roadway itself or the associated labels.

Figure 6:
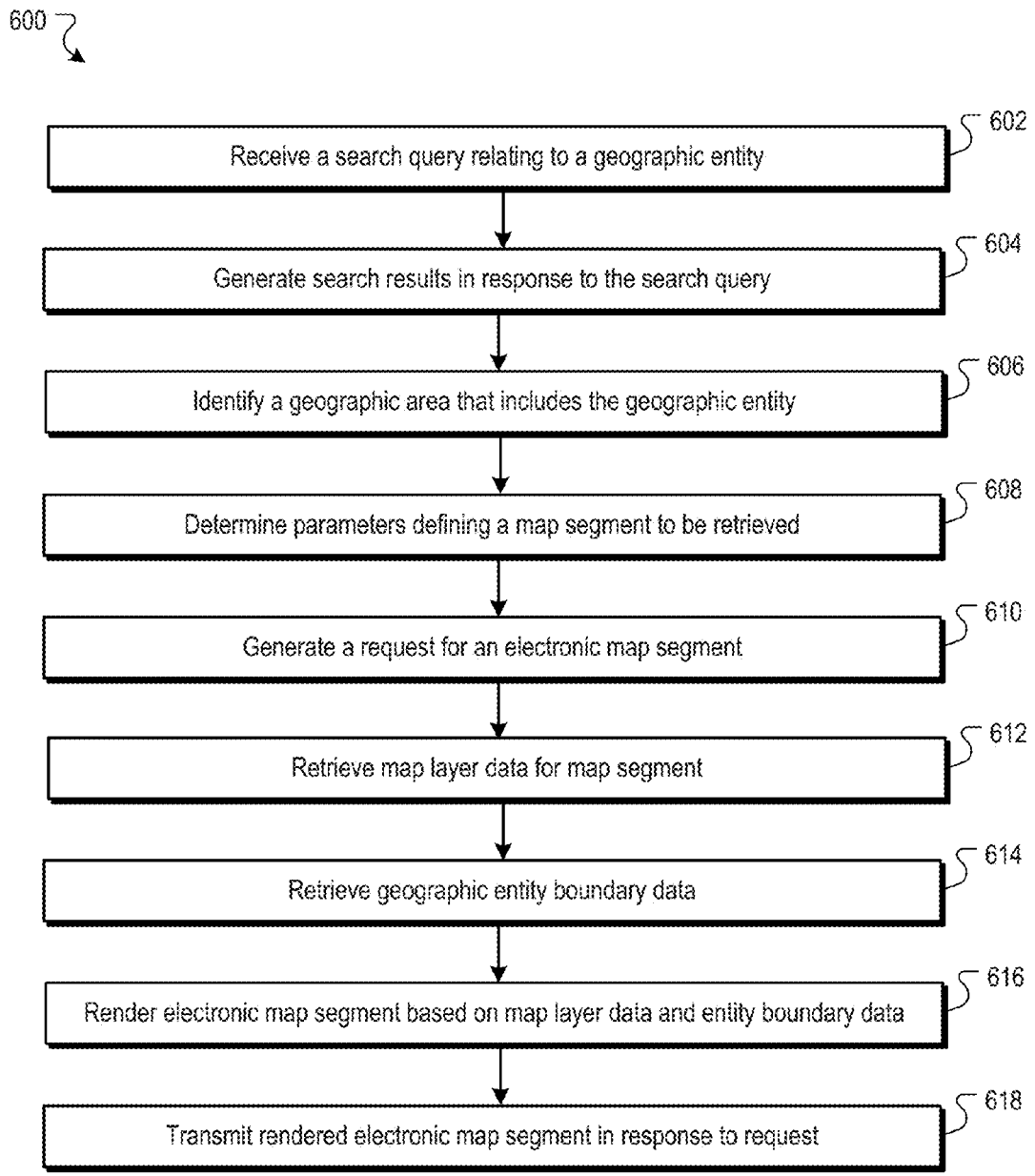
FIG. 6 is a flow diagram of a process for dynamically generating an electronic map segment with a highlighted boundary.

FIG. 6 is a flow diagram of a process 600 for dynamically generating an electronic map segment with a highlighted boundary. The process 600 includes receiving a search request that relates to a geographic entity at 602. The search request can be determined to relate to the geographic entity based on including the entity name or a shorthand version of the entity name and/or based on a likelihood that the geographic entity is what is intended (e.g., based on the general location from which the search request originates and/or based on relative popularity of similar named places). The search request can be interpreted as being, implicitly, a request for an electronic map segment that includes the geographic entity based on the type of search web page used to submit the search request (e.g., a search within a map search field can be implicitly interpreted as a request to retrieve the map). Alternatively, the search request (e.g., in a general web search web page) can be interpreted such that one possible result is an electronic map of the geographic entity.

One or more search results are generated at 604 in response to the search query, at least one of which includes the geographic entity. A general geographic region or area that includes the geographic entity is identified at 606. The identification of the region or area can be based on a central location within the geographic entity and on an extent to which the entity expands from the central location. Based on the identified general geographic region or area, parameters defining a map segment to be retrieved can be determined at 608. The parameters can define, for example, a plurality of map tiles needed to cover the region or area, an appropriate zoom level for a map that displays the geographic entity (e.g., such that all or most of the full extent of the entity is included within a displayed map segment), and/or geographic coordinates for the outer edges of the desired map segment.

A request for an electronic map segment is generated and sent at 610. The request includes an indication that the requested map segment is to include boundary highlighting and an identification of the geographic entity to be highlighted in the requested map segment. For example, such information can be included along with the parameters defining the map segment in the form of one or more resource identifiers (e.g., URLs). Multiple layers of map data associated with the identified region or area and with the requested map segment are retrieved at 612. For example, the map data layers that are needed can be determined based on the parameters included in the request to generate a map segment. Data defining a boundary of the identified geographic entity is also retrieved at 614. The electronic map segment is rendered at 616 using the retrieved map data layers and the geographic entity boundary data. In addition, the rendering can be performed such that one or more of the retrieved layers (e.g., labels, roads, icons, and/or geographic features) are rendered over the rendering of the highlighted boundary for the geographic entity. The rendered map segment can then be transmitted (e.g., to a requesting user device) in response to the electronic map segment request at 618.

Figure 7:
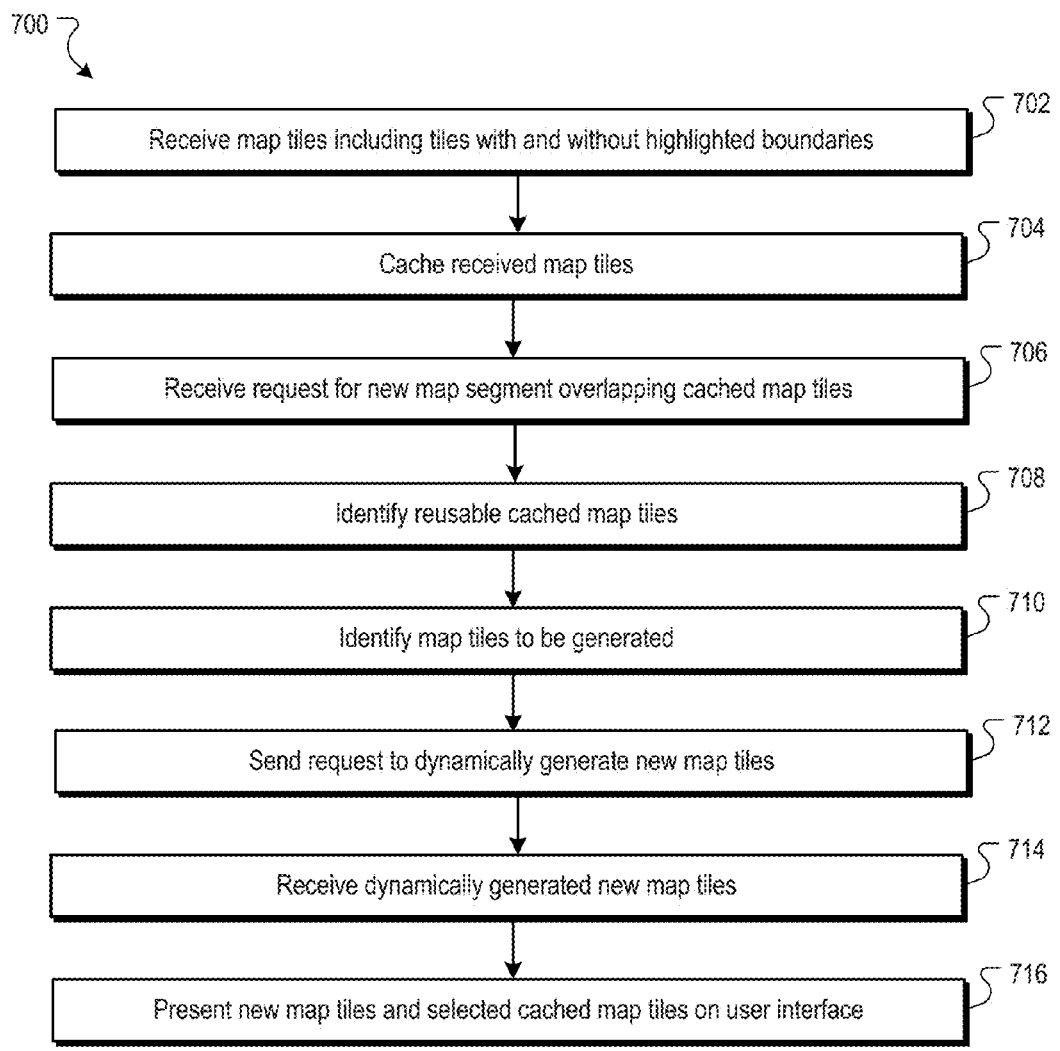
FIG. 7 is a flow diagram of a process for using both map segments that include highlighted boundaries and map segments that do not include highlighted boundaries.

FIG. 7 is a flow diagram of a process 700 for using both map segments that include highlighted boundaries and map segments that do not include highlighted boundaries. The process 700 includes receiving a plurality of map tiles at 702 and caching the map tiles at 704. The plurality of map tiles can include some map tiles that include boundary highlighting and other map tiles that do not include boundary highlighting (e.g., areas of the map segment that do not include any of the geographic entity having a highlighted boundary). Subsequently, at 706, a request for a new map segment that includes at least some overlap with the plurality of map tiles cached at 704 is received. The request does not include an indication that the same geographic entity is to be highlighted. For example, the request can indicate that a different geographic entity should be highlighted or that no highlighting should be included.

Based on the request, one or more map tiles in the cache are identified at 708 for use in rendering the new map segment. For example, the map tiles that can be reused may be identified based on a match between resource identifiers for map tiles included in the request and resource identifiers for map tiles stored in the cache. In addition, one or more map tiles that need to be generated are identified at 710. For example, although the cache may include map tiles that cover the same area, the cached map tiles may include highlighted boundaries that are not desired in the new map segment. The need for generating the map tiles, despite covering the same area as some of the cached map tiles, can be identified based on differences in the resource identifiers between resource identifiers for map tiles included in the request (e.g., indicating no highlighting or highlighting of a different entity) and resource identifiers for map tiles stored in the cache (e.g., indicating highlighting of the original entity). A request to generate the new map tiles can be sent at 712, and the dynamically generated map tiles can be received in response at 714. The newly generated map tiles and the selected cached map tiles can then be presented on a display at 716 in response to the request.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Servers may provide geographic information (polygon, polyline, label location and text) to a client device, and map rendering may be performed on the client device. Alternatively, geographic information can be stored in local storage, such as CD/DVD-ROM, hard disk drive, or USB drive, and information retrieval, processing, and map rendering can be done on the client device, in which case no network connection is required. The map rendering module may return multiple layer images to client device, where those images are overlaid to obtain a final map image with highlighted boundaries.

What is claimed is:

1. A method in a client device, the method comprising:
receiving, by one or more processors via a user interface of the client device, a search query;
transmitting, by the one or more processors, the search query to a search system via a communication network,
receiving, by the one or more processors from the search system, one or more search results and an identification of a geographic region associated with the one or more search results;
generating, by the one or more processors, a request for an electronic map segment for a geographic region, including providing, in the request, (i) an identification of a geographic entity corresponding to one of the search results and included in the geographic region, and (ii) an indication that a map rendering module will highlight the geographic entity in the requested electronic map segment;
transmitting the generated request to the map rendering module implemented in a map generation server via the communication network;
receiving, by the one or more processors, from the map generation server in response to the request, an electronic map segment rendered based on (i) a plurality of layers of map data, each illustrating a respective type of geographic information, and (ii) polyline information defining a boundary of the geographic entity, wherein a highlighted boundary is rendered using the polyline information, and wherein one or more of the plurality of layers, including a roads layer, are rendered over the rendering of the highlighted boundary of the geographic entity; and
presenting the electronic map segment via the user interface, wherein the rendering of the highlighted boundary does not obscure features in the one or more of the plurality of layers.

2. The method of claim 1, further comprising:
receiving, at the client via the user interface, a selection of a particular search result, and
transmitting the request for the electronic map segment for the geographic region in response to the selection of the particular search result.

3. The method of claim 1, further comprising:
receiving, at the client device via the user interface, a selection of an option to include highlighting of searched geographic features, and
including, by the one or more processors, the identification of the geographic entity in the request in response to the selection of the option.

4. The method of claim 1, wherein the received electronic map segment comprises a first subset of the plurality of map tiles that include at least a part of the geographic entity highlighted by the map rendering module, the method further comprising:
caching, at the client device, a second subset of the plurality of map tiles that do not include the geographic entity highlighted by the map rendering module, and
presenting the second subset of the plurality of map tiles along with the first subset of the plurality of map tiles.

5. The method of claim 1, wherein generating the request for the electronic map segment includes generating a uniform resource locator (URL).

6. The method of claim 1, wherein generating the request for the electronic map segment includes generating the request based on a type of map to be presented via the user interface, wherein the type is one of (i) a plain map, (ii) a terrain map, (iii) a satellite map, or a combination of (i) through (iii).

7. The method of claim 1, wherein receiving the search query includes displaying a web page via the user interface and receiving the search query via the web page.

8. The method of 1, wherein receiving the one or more search results and the identification of the geographic region includes receiving a web page that includes a list of the one or more search results.

9. A client device comprising:
one or more processors;
a user interface; and
a computer-readable memory storing instructions which, when executed by the one oir more processors, cause the client device to:
receive a search query via the user interface,
transmit the search query to a search system via a communication network,
receive, from the search system, one or more search results and an identification of a geographic region associated with the one or more search results,
generate a request for an electronic map segment for a geographic region, including provide, in the request, (i) an identification of a geographic entity corresponding to one of the search results and included in the geographic region, and (ii) an indication that a map rendering module will highlight the geographic entity in the requested electronic map segment, transmit the generated request to the map rendering module implemented in a map generation server via the communication network, receive, from the map generation server in response to the request, an electronic map segment rendered based on (i) a plurality of layers of map data, each illustrating a respective type of geographic information, and (ii) polyline information defining a boundary of the geographic entity, wherein a highlighted boundary is rendered using the polyline information, and wherein one or more of the plurality of layers, including a roads layer, are rendered over the rendering of the highlighted boundary of the geographic entity; and present the electronic map segment via the user interface, wherein the rendering of the highlighted boundary does not obscure features in the one or more of the plurality of layers.

10. The client device of claim 9, wherein the instructions further cause the client device to:

receive, at the client device via the user interface, a selection of a particular search result, and transmit the request for the electronic map segment for the geographic region in response to the selection of the particular search result.

11. The client device of claim 9, wherein the instructions further cause the client device to:

receive, via the user interface, a selection of an option to include highlighting of searched geographic features, and include the identification of the geographic entity in the request in response to the selection of the option.

12. The client device of claim 9, wherein the received electronic map segment comprises a first subset of the plurality of map tiles that include at least a part of the geographic entity highlighted by the map rendering module, wherein the instructions further cause the client device to:

cache a second subset of the plurality of map tiles that do not include the geographic entity highlighted by the map rendering module, and present the second subset of the plurality of map tiles along with the first subset of the plurality of map tiles.

13. The client device of claim 9, wherein to generate the request for the electronic map segment, the instructions cause the client device to generate a URL.

14. The client device of claim 9, wherein to generate the request for the electronic map segment, the instructions cause the client device to generate the request based on a type of map to be presented via the user interface, wherein the type is one of (i) a plain map, (ii) a terrain map, (iii) a satellite map, or a combination of (i) through (iii).

15. The client device of claim 9, wherein to receive the search query, the instructions cause the client device to display a web page via the user interface and receive the search query via the web page.

16. The client device of claim 9, wherein to receive the one or more search results and the identification of the geographic region, the instructions cause the client device to receive a web page that includes a list of the one or more search results.

17. A system comprising:

one or more servers of a search system configured to:
receive a search query from a client device via communication network,
generate one or more search results and an identification of a geographic region associated with the one or more search results, and
transmit the one or more search results and the identification of the geographic region to the client device via the communication network;

the system further comprising:

one or more servers of a map generation system configured to:
receive, from the client device, a request for an electronic map segment, including receive an identification of a geographic entity included in the geographic region, and (ii) an indication that the map generation system will highlight the geographic entity in the requested electronic map segment,
render the electronic map segment based on a plurality of layers of map data and polyline information defining a boundary of the geographic entity, including:
render a highlighted boundary of the geographic entity using the polyline information, and
render one or more of the plurality of layers, including a roads layer, over the rendering of the highlighted boundary of the geographic entity, wherein the rendering of the highlighted boundary does not obscure features in the one or more of the plurality of layers, and
transmit the electronic map segment to the client device for presentation via user interface of the client device.

18. The system of claim 17, wherein the one or more servers of a map generation system are configured to generate the electronic map segment based on a type of map corresponding to one of (i) a plain map, (ii) a terrain map, (iii) a satellite map, or a combination of (i) through (iii), wherein a selection of the type of map is included in the request for the electronic map segment.

19. The system of claim 17, wherein to transmit the one or more search results and the identification of the geographic region to the client device, the one or more servers of a search system are configured to generate a URL.

* * * * *